(12) United States Patent
Arisawa et al.

(10) Patent No.: US 10,211,765 B2
(45) Date of Patent: Feb. 19, 2019

(54) MOTOR CONTROL DEVICE, VACUUM CLEANER, AND HAND DRIER

(71) Applicant: Mitsubishi Electric Corporation, Tokyo (JP)

(72) Inventors: Koichi Arisawa, Tokyo (JP); Keisuke Uemura, Tokyo (JP); Yuji Takayama, Tokyo (JP); Yosuke Shinomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/757,733

(22) PCT Filed: Oct. 30, 2015

(86) PCT No.: PCT/JP2015/080769
§ 371 (c)(1),
(2) Date: Mar. 6, 2018

(87) PCT Pub. No.: WO2017/072960
PCT Pub. Date: May 4, 2017

(65) Prior Publication Data
US 2018/0351483 A1 Dec. 6, 2018

(51) Int. Cl.
*H02P 27/04* (2016.01)
*H02P 6/16* (2016.01)
(Continued)

(52) U.S. Cl.
CPC .............. *H02P 6/16* (2013.01); *A47K 10/48* (2013.01); *A47L 9/2831* (2013.01);
(Continued)

(58) Field of Classification Search
CPC .. H02P 3/18; H02P 27/04; H02P 27/06; H02P 6/00; H02P 1/00; H02P 3/00; H02P 6/14; H02P 1/46
(Continued)

(56) References Cited

U.S. PATENT DOCUMENTS 7,504,784 B2 * 3/2009 Asada .................. D06F 37/304
318/400.02
8,674,634 B2 3/2014 Dai
(Continued)

FOREIGN PATENT DOCUMENTS

| JP | 05-152960 A | 6/1993 |
| JP | 2012-080767 A | 4/2012 |
| JP | 5473979 B2 | 4/2014 |

OTHER PUBLICATIONS

International Search Report of the International Searching Authority dated Dec. 8, 2015 for the corresponding international application No. PCT/JP2015/080769 (and English translation).

*Primary Examiner* — Antony M Paul
(74) *Attorney, Agent, or Firm* — Posz Law Group, PLC

(57) ABSTRACT

A motor control device includes a position sensor that detects a position of a motor, an AD converter that converts an analog signal, which is a detection value of a motor current, into a digital signal, and a control circuit that drives an inverter using an output signal of the AD converter. The control circuit starts the AD converter during a permission period, and performs processing for the analog-digital converter during an electrical half cycle including a permission period. The length of a prohibition period obtained by excluding a permission period from an electrical half cycle decreases as the rotating speed of the motor increases.

13 Claims, 12 Drawing Sheets

(51) Int. Cl.
    *H02P 6/28*          (2016.01)
    *A47L 9/28*          (2006.01)
    *A47K 10/48*        (2006.01)
    *H02M 7/5395*      (2006.01)

(52) U.S. Cl.
    CPC .............. *A47L 9/2842* (2013.01); *H02P 6/28* (2016.02); *H02M 7/5395* (2013.01)

(58) Field of Classification Search
    USPC ......... 318/400.01, 400.14, 400.02, 700, 701, 318/721, 599, 799, 800, 801, 430, 432; 341/110, 126, 142, 155; 369/47.35
    See application file for complete search history.

(56) References Cited

U.S. PATENT DOCUMENTS

2012/0081046 A1    4/2012    Dai et al.
2012/0081050 A1    4/2012    Dai

\* cited by examiner

MOTOR CONTROL DEVICE, VACUUM CLEANER, AND HAND DRIER

CROSS REFERENCE TO RELATED APPLICATION

This application is a U.S. national stage application of International Patent Application No. PCT/JP2015/080769 filed on Oct. 30, 2015, the disclosure of which is incorporated herein by reference.

TECHNICAL FIELD

The present invention relates to a motor control device that controls a brushless motor, a vacuum cleaner, and a hand drier.

BACKGROUND

In a motor control device, in general, there has been used a system for controlling energization of a stator winding wire according to a rotor rotation position.

As an example of such motor control, Patent Literature 1 describes that, in control of a brushless motor including a position sensor that detects a rotor rotation position, a motor control device starts up an analog-digital converter in response to a first edge of a position sensor signal and reads a digital signal from the analog-digital converter in response to a second edge different from the first edge.

PATENT LITERATURE

Patent Literature 1: Japanese Patent No. 5473979

Incidentally, in control of a motor, control is sometimes performed in which an edge of a position sensor signal is synchronized with a zero-cross point of a motor current. That is, control is sometimes performed in which a timing for detecting a point between magnetic poles of a rotor from the position sensor signal is synchronized with a timing of a zero-cross point of the motor current.

On the other hand, it has been known that noise is caused by a current polarity being switched at the zero-cross point of the motor current.

Therefore, when control is performed in which an edge of the position sensor signal is synchronized with the zero-cross point of the motor current, noise caused at a timing of the zero-cross point of the motor current becomes a factor of a detection error of the edge, thereby making a point between magnetic poles of the rotor difficult to accurately detect based on edge detection.

Therefore, in the above-mentioned conventional control for starting the analog-digital converter in response to a first edge of the position sensor signal and reading a digital signal from the analog-digital converter in response to a second edge different from the first edge, when the edge of the position sensor signal and the zero-cross point of the motor current coincide with each other, noise caused by switching of a polarity of the current is included in the digital signal used for the motor control, thereby making stable control of the motor difficult to realize.

In particular, when a detection error of the rotor rotation position increases, a timing of energization switching of the stator winding wire deviates, a power factor of an electric current flowing in the stator winding wire and an induced voltage generated in the stator winding wire decreases, thereby making motor efficiency deteriorated, and unevenness occurs in motor torque, thereby increasing vibration and undesired sound.

The above-mentioned noise is particularly conspicuous in a high-rotational-speed region in which the number of revolutions of the rotor is 100 thousand revolutions per minute (rpm) or more. The vibration and the undesired sound also conspicuously appear in this high-rotational-speed region. Therefore, a problem is how to reduce the influence of the noise to realize stable control of a motor particularly in a vacuum cleaner or a hand drier.

SUMMARY

The present invention has been devised in view of the above circumstances, and an object of the invention is to provide a motor control device capable of reducing the influence of noise on the control and realizing stable motor control.

In order to solve the above-mentioned problems and achieve the object, the present invention provides a motor control device used for a motor driven by an inverter, the motor control device comprising: a position detecting unit to detect a position of the motor; an analog-digital converter to convert an analog signal into a digital signal, the analog signal being a detection value of an alternating current flowing in the motor; and a control circuit to use an output signal from the analog-digital converter to drive the inverter, wherein the control circuit starts the analog-digital converter during a first period, and performs processing for the analog-digital converter during a second period, the second period is a period from a change point of an output signal from the position detecting unit to a next change point of the output signal, the first period is shorter than the second period and does not include the change points, and a length of a third period obtained by excluding the first period from the second period decreases as a rotating speed of the motor increases.

According to the present invention, there is an advantageous effect that it is possible to reduce the influence of noise on control and realize stable motor control.

DETAILED DESCRIPTION

Embodiments of a motor control device, a vacuum cleaner, and a hand drier according to the present invention are explained in detail below with reference to the drawings. Note that the present invention is not limited by the embodiments.

First Embodiment

Figure 1:
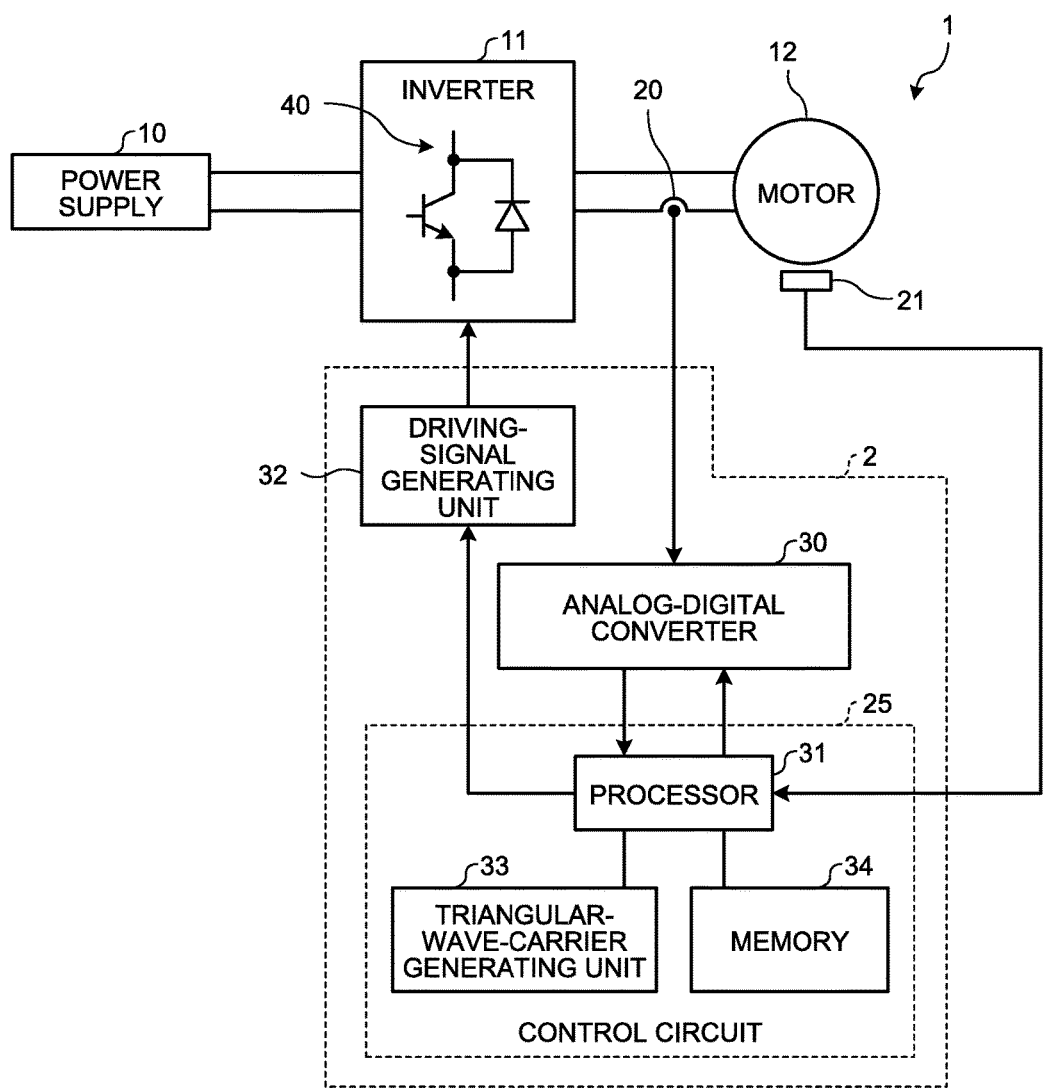
FIG. 1 is a block diagram illustrating a configuration of a motor control system according to a first embodiment.
Figure 2:
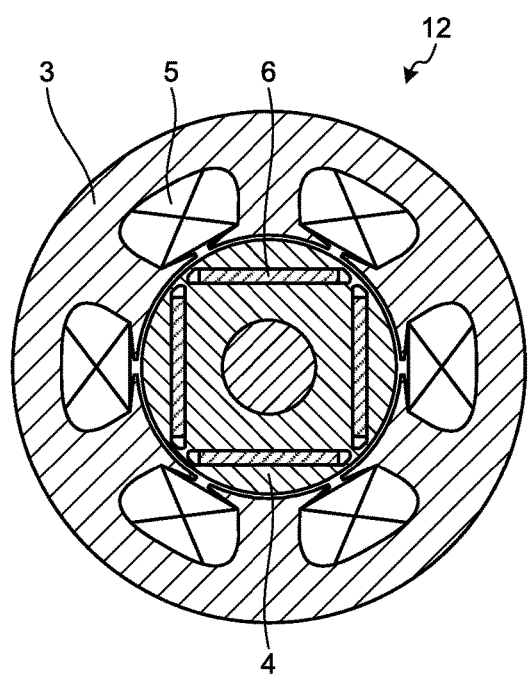
FIG. 2 is a view showing a configuration of a motor in the first embodiment.

FIG. 1 is a block diagram illustrating a configuration of a motor control system 1 according to a first embodiment. FIG. 2 is a view showing a configuration of a motor 12. As illustrated in FIG. 1, the motor control system 1 includes: the motor 12; an inverter 11 connected to the motor 12, which outputs alternating-current power to the motor 12 to drive the motor 12; a power supply 10 showing as a direct-current power supply to the inverter 11; a position sensor 21 provided in a stator 3 of the motor 12, which detects a rotor rotation position that is a rotation position of a rotor 4 of the motor 12; a current sensor 20 serving as a current detector unit, which detects a motor current that is an alternating current flowing to the motor 12; and a motor control device 2 that controls the inverter 11 on the basis of the rotor rotation position and the motor current.

The motor 12 is a brushless motor and includes the stator 3 having an annular shape and the rotor 4 disposed on an inner side of the stator 3. The rotor 4 includes a plurality of permanent magnets 6 arrayed in a circumferential direction. These permanent magnets 6 are arranged such that a magnetization orientation alternately reverses in the circumferential direction, and form a plurality of magnetic poles of the rotor 4. A winding wire 5 is wound on the stator 3. The motor current is an alternating current flowing to the winding wire 5. In the following explanation, the number of the permanent magnets 6 is four as illustrated in the figure and the number of magnetic poles is four. However, the number of the permanent magnets 6 or the number of magnetic poles may be another number.

The position sensor 21 is position detecting means for detecting the position of the motor 12. The position sensor 21 outputs a position sensor signal that is a digital signal to the motor control device 2. That is, the position sensor signal is an output signal of the position sensor 21. The position sensor signal is a signal for detecting a rotation position of the rotor 4 and is two-valued, high or low according to the direction of a magnetic flux from the rotor 4. Therefore, an edge of the position sensor signal corresponds to an inter-magnetic-pole point. The edge of the position sensor signal is a change point of the position sensor signal. The edge is a rising point or a falling point of the signal.

The inverter 11, which is a power converter, is configured by combining a plurality of switching elements 40 constituting not-illustrated upper and lower arms. The switching element 40 is configured by connecting a reflux diode in anti-parallel to a transistor. Note that the reflux diode can be a parasitic diode. The inverter 11 is, for example, a single-phase inverter but may be a multi-phase inverter.

The current sensor 20 is connected between the motor 12 and the inverter 11 and detects a motor current. A detection value of the current sensor 20 is an analog signal.

The motor control device 2 includes: an analog-digital converter 30 that converts an analog signal, which corresponds to a detection value of the motor current detected by the current sensor 20, into a digital signal; a control circuit 25 that generates a Pulse Width Modulation (PWM) signal on the basis of the motor current read from the analog-digital converter 30, the position sensor signal from the position sensor 21, and a not-illustrated number-of-revolutions command; and a driving-signal generating unit 32 that generates, on the basis of the PWM signal outputted from the control circuit 25, a driving signal for driving the inverter 11.

The control circuit 25 includes a processor 31, a triangular-wave-carrier generating unit 33, and a memory 34. The control circuit 25 generates, with publicly-known PWM control, a voltage command to be applied to the motor 12, and compares the voltage command and a triangular wave carrier generated by the triangular-wave-carrier generating unit 33 to generate a PWM signal. The driving-signal generating unit 32 generates, on the basis of the PWM signal from the control circuit 25, a driving signal for controlling ON or OFF of the switching elements 40 of the inverter 11, and outputs the driving signal to the inverter 11.

In this way, the control circuit 25 performs processing for reading the digital signal from the analog-digital converter 30, and uses the digital signal that is an output signal of the analog-digital converter 30 to generate the PWM signal for driving the inverter 11. Note that the control circuit 25 including the inverter 11 can also be defined.

An example of the configuration of the analog-digital converter 30 is explained. In the following explanation, the analog-digital converter 30 is a successive approximation type. However, a specific configuration of the analog-digital converter 30 is not limited to the successive approximation type. In the following explanation, the "analog-digital converter" is sometimes abbreviated as "AD converter 30", ant the "analog-digital conversion" is sometimes abbreviated as "AD conversion".

Figure 3:
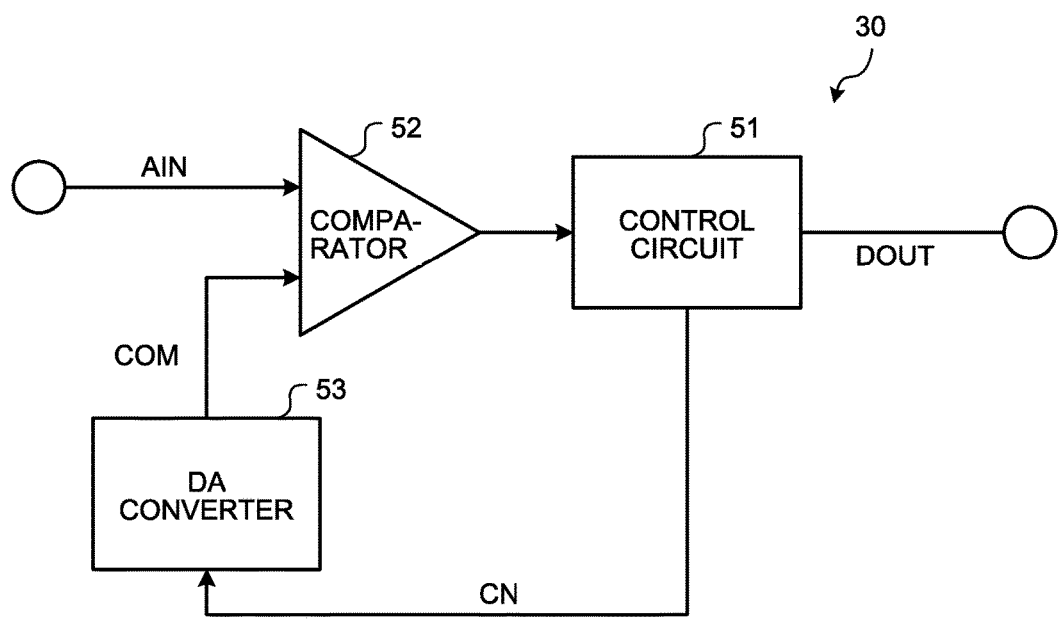
FIG. 3 is a block diagram illustrating an example of a configuration of an AD converter in the first embodiment.

FIG. 3 is a block diagram illustrating an example of the configuration of the AD converter 30. As illustrated in FIG. 3, the AD converter 30 includes a control circuit 51, a comparator 52, and a digital-analog (DA) converter 53. Note that details of the operation of the AD converter 30 illustrated in FIG. 3 are described in Japanese Patent Application Laid-Open No. H5-152960.

The control circuit 51 includes a not-illustrated processor. The comparator 52 compares a comparison signal COM from the DA converter 53 and an analog input signal AIN in magnitude, and outputs a comparison result to the control circuit 51. The analog input signal AIN corresponds to a motor current. The control circuit 51 outputs, according to the comparison result, a control signal CN approximating the analog input signal AIN to the DA converter 53. The DA converter 53 outputs the comparison signal COM corresponding to the control signal CN to the comparator 52. The control circuit 51 executes control for successive approximation of the comparison signal COM into the analog input signal AIN to thereby obtain a digital signal DOUT corresponding to the analog input signal AIN. The control circuit 51 retains the digital signal DOUT in a not-illustrated register.

Figure 4:
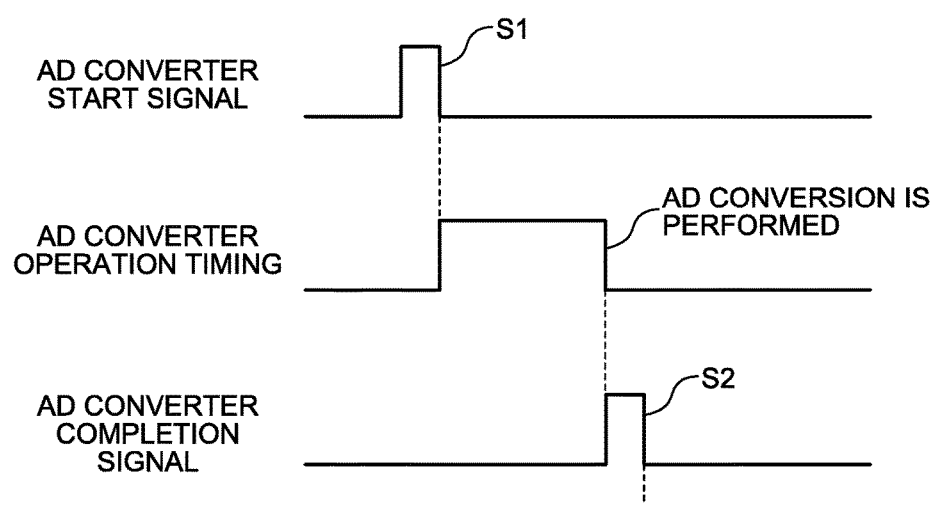
FIG. 4 is a chart illustrating an example of communication of signals between a processor and the AD converter in the first embodiment.

FIG. 4 is a chart illustrating an example of communication of signals between the processor 31 and the AD converter 30. First, the processor 31 outputs a start signal S1 to the AD converter 30. The start signal S1 is a signal for instructing the AD converter 30 to start AD conversion. The processor 31 starts up the AD converter 30 by outputting the start signal S1.

When receiving the start signal S1, the AD converter 30 initiates AD conversion processing for converting an analog signal into a digital signal. Specifically, when receiving the start signal S1, the control circuit 51 of the AD converter 30 initiates successive comparison processing.

After completion of the AD conversion, the AD converter 30 outputs a completion signal S2 indicating that the AD conversion has been completed to the processor 31. Specifically, the control circuit 51 outputs the completion signal S2 to the processor 31. The processor 31 performs processing of the AD converter 30 after receiving the completion signal S2 from the AD converter 30. That is, the processor 31 reads a digital signal from the AD converter 30. Specifically, the processor 31 reads digital data stored in a register in the control circuit 51.

In this way, the AD converter 30 starts the AD conversion processing when the start signal S1 is inputted from the processor 31, and outputs the completion signal S2 to the processor 31 when the AD conversion processing has been completed, then to stop the AD conversion processing.

Figure 5:
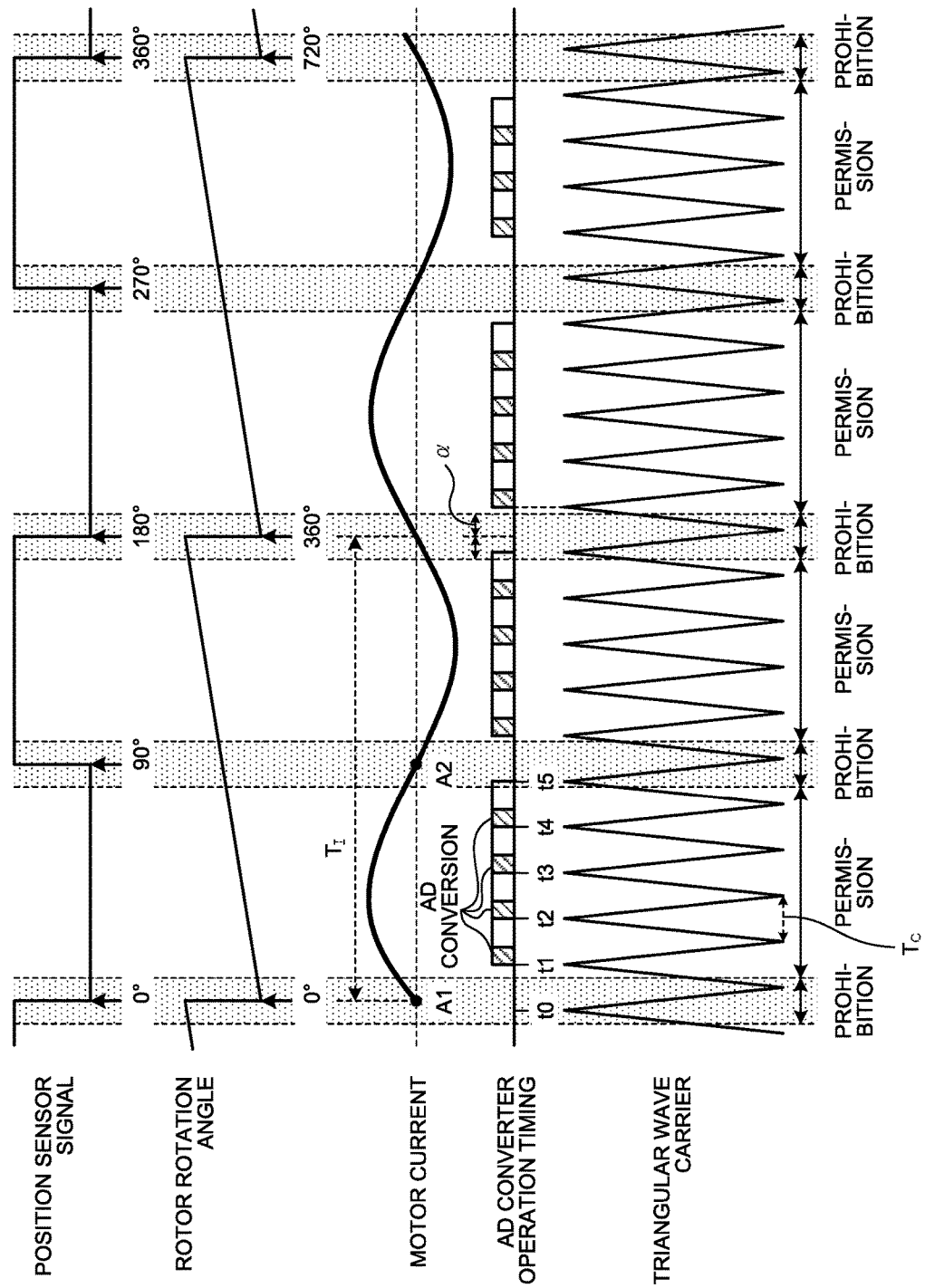
FIG. 5 is a timing chart for explaining timings of a start of the AD converter and reading of a digital signal from the AD converter in the first embodiment.

Timings of a start of the AD converter 30 and reading of a digital signal from the AD converter 30 are explained with reference to FIG. 5. FIG. 5 is a timing chart for explaining the timings of the start of the AD converter 30 and the reading of a digital signal from the AD converter 30.

In FIG. 5, a "position sensor signal" represents an output signal of the position sensor 21 inputted to the processor 31. Note that angles written right under the position sensor signal waveform are mechanical angles of a rotor. The position sensor signal includes edges at mechanical angles of 0°, 90°, 180°, 270°, and 360° correspondingly with the rotor 4 having four poles.

A "rotor rotation angle" represents an electrical angle of the rotor 4. That is, when the number of magnetic poles is represented as P, an electrical angle is given by (Electrical angle)=(Mechanical angle)×P/2. The processor 31 calculates a rotor rotation angle on the basis of the position sensor signal. Note that angles written right under the rotor rotation angle waveform are electrical angles.

A "motor current" represents a waveform of a motor current. The "motor current" is given for comparison with the "rotor rotation angle". As illustrated in FIG. 5, edges of the position sensor signal are synchronized with zero-cross points of the motor current. The zero-cross points are change points of a polarity in a waveform of a signal and are points where the polarity is switched from positive to negative or negative to positive. In FIG. 5, zero-cross points A1 and A2 adjacent to each other are illustrated. A period from the zero-cross point A1 to the zero-cross point A2 is an electrical half cycle of the motor current determined by the zero-cross points A1 and A2. As seen above, the following explanation is given for control being performed in which the edges of the position sensor signal are synchronized with the zero-cross points of the motor current. In this case, a rotor rotation angle gives phase information of the motor current.

Next, "AD converter operation timing" and a "triangular wave carrier" are explained. The "AD converter operation timing" represents AD conversion processing. The "triangular wave carrier" represents a waveform of the triangular wave carrier. In this embodiment, a constant phase angle range including a zero-cross point is set as a prohibition range in which a start of the AD converter 30 is prohibited. Specifically, a phase angle range of a total 2α consisting of α and α respectively before and after the zero-cross point being centered is set as the prohibition range. The processor 31 does not output the start signal S1 to the AD converter 30 in the prohibition range. The AD converter 30, to which the start signal S1 is not inputted, does not execute the AD conversion processing and does not output the completion signal S2 indicating that the AD conversion processing has been completed.

A range other than the prohibition range is a permission range in which the start of the AD converter 30 is permitted. That is, the start-up of the AD converter 30 by the processor 31 is permitted only in the permission range. Note that reading of a digital signal from the AD converter 30 is permitted irrespective of the prohibition range or the permission range. The permission range is between the prohibition ranges adjacent to each other. A period corresponding to the prohibition range, that is, a term obtained by temporally reading the prohibition range is hereinafter referred to as prohibition period. Similarly, a period corresponding to the permission range is hereinafter referred to as permission period. The prohibition period is substantially the same as the prohibition range. The permission period is substantially the same as the permission range.

Figure 6:
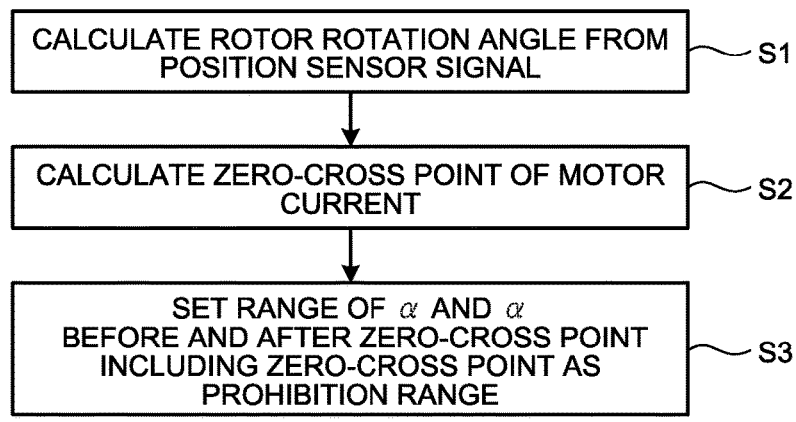
FIG. 6 is a flowchart for determining a prohibition range in the first embodiment.

FIG. 6 is a flowchart for determining a prohibition range. As illustrated in FIG. 6, the processor 31 calculates a rotor rotation angle from a position sensor signal (S1), calculates a zero-cross point of a motor current on the basis of the calculated rotor rotation angle (S2), and sets a range having α and α before and after the zero-cross point including the zero-cross point as a prohibition range (S3).

Note that, when a cycle that is an electrical cycle of the motor current is represented as $T_I$, the length of a prohibition period is given by $2\times(\alpha/360)\times T_I$ and the length of a permission period in a half cycle, which is an electrical half cycle of the motor current, is given by $T_I/2-2\times(\alpha/360)\times T_I$. Because an edge of the position sensor signal and the zero-cross point of the motor current are synchronized, the cycle $T_I$ is a cycle of the motor current and is also a cycle of the position sensor signal.

α is a predetermined angle larger than 0 and smaller than 90°. In the illustrated example, α is 10°. In this case, prohibition ranges are a range of −10° or more and 10° or less, a range of 170° or more and 190° or less, a range of 350° or more and 370° or less, a range of 530° or more and 550° or less, and a range of 710° or more and 730° or less. After calculating the rotor rotation angle, the processor 31 determines a prohibition range and a permission range on the basis of the rotor rotation angle and the predetermined α.

This embodiment is on the premise that the start of the AD converter 30 and the reading from the AD converter 30 by the processor 31 are performed at a timing of a ridge point of a triangular wave carrier generated by the triangular-wave-carrier generating unit 33. Note that the start of the AD converter 30 and the reading from the AD converter 30 can be performed at a timing other than the ridge point of the triangular wave carrier, for example, a timing of a trough point or the timings of both of the ridge point and the trough point. Alternatively, timing can be determined irrespective of the triangular wave carrier. Note that the embodiment assumes that the AD conversion processing for one unit of sampling data is executed in a period of time shorter than a cycle $T_c$ of the triangular wave carrier.

Further, the embodiment assumes that one permission period is larger than a double of the cycle $T_c$ of the triangular wave carrier. Consequently, two or more ridge points of the triangular wave carrier are included in one and the same permission range. Therefore, it is possible to realize the start of the AD converter 30 and the reading from the AD converter 30 in one and the same permission range.

"AD converter operation timing" is explained in detail. In the following explanation, a "period" is used for explanation, but the "period" can be read as "range". The processor 31 determines on the basis of the calculated rotor rotation angle whether or not a time point t0, which is a timing of a ridge point, is present in the permission period. Because the time point t0 is present in the prohibition period, the processor 31 does not perform the start of the AD converter 30.

Subsequently, the processor 31 determines, on the basis of the calculated rotor rotation angle, whether a time point t1 that is a timing of a ridge point following the time point t0 is within the permission period. Because the time point t1 is present in the permission period, the processor 31 outputs the start signal S1 to the AD converter 30 at the time point t1. Note that the permission period in this case is included in an electrical half cycle from the zero-cross point A1 to the zero-cross point A2. When receiving the start signal S1, the AD converter 30 executes the AD conversion processing. In FIG. 5, a range in which the AD conversion is in the process of being performed is indicated by "AD conversion" with hatching. When completing the AD conversion processing, the AD converter 30 outputs the completion signal S2 to the processor 31, and the processor 31 receives the completion signal S2 from the AD converter 30.

This example is based on the premise that two or more ridge points of the triangular wave carrier are included in one permission period. Therefore, a time point t2 that is a timing of a ridge point following the time point t1 is within the permission period. Then, at the time point t2, the processor 31 reads a digital signal from the AD converter 30 and outputs the start signal S1 to the AD converter 30. The processor 31 uses the digital signal for the control. When receiving the start signal S1, the AD converter 30 executes the AD conversion processing and rewrites the register with digital data obtained after the AD conversion. When completing the AD conversion processing, the AD converter 30 outputs the completion signal S2 to the processor 31, and receives the completion signal S2 from the AD converter 30.

Subsequently, the processor 31 determines, on the basis of the calculated rotor rotation angle, whether or not a time point t3 that is a timing of a ridge point following the time point t2 is within the permission period. Because the time point t3 is present in the permission period, at the time point t3, the processor 31 reads a digital signal from the AD converter 30 and outputs the start signal S1 to the AD converter 30. Then, the processor 31 uses the digital signal for the control. When receiving the start signal S1, the AD converter 30 executes the AD conversion processing and rewrites the register with digital data obtained after the AD conversion. When completing the AD conversion processing, the AD converter 30 outputs the completion signal S2 to the processor 31, and receives the completion signal S2 from the AD converter 30.

Subsequently, the processor 31 determines, on the basis of the calculated rotor rotation angle, whether or not a time point t4 that is a timing of a ridge point following the time point t3 is within the permission period. Because the time point t4 is present in the permission period, at the time point t4, the processor 31 reads a digital signal from the AD converter 30 and outputs the start signal S1 to the AD converter 30. Then, the processor 31 uses the digital signal for the control. When receiving the start signal S1, the AD converter 30 executes the AD conversion processing and rewrites the register with digital data obtained after the AD conversion. When completing the AD conversion processing, the AD converter 30 outputs the completion signal S2 to the processor 31, and the processor 31 receives the completion signal S2 from the AD converter 30.

Further, the processor 31 determines, on the basis of the calculated rotor rotation angle, whether or not a time point t5 that is a timing of a ridge point following the time point t4 is within the permission period. Because the time point t5 is present in the prohibition period, the processor 31 does not output the start signal S1 to the AD converter 30. Moreover, the processor 31 determines whether or not the time point t5 is present in the electrical half cycle of from the zero-cross point A1 until the zero-cross point A2. Because the time point t5 is present in the electrical half cycle, at the time point t5, the processor 31 reads a digital signal from the AD converter 30. Then, the processor 31 uses the digital signal for the control.

The processor 31 repeats the operation explained above during the operation of the motor 12.

Motor control in the prohibition period is now explained. In this embodiment, the processor 31 does not perform reading from the AD converter 30 in the prohibition period. However, the processor 31 estimates a current value of a motor current from a measurement value of the motor current obtained in the permission period immediately before the prohibition period and performs motor control using the estimated current value.

Figure 7:
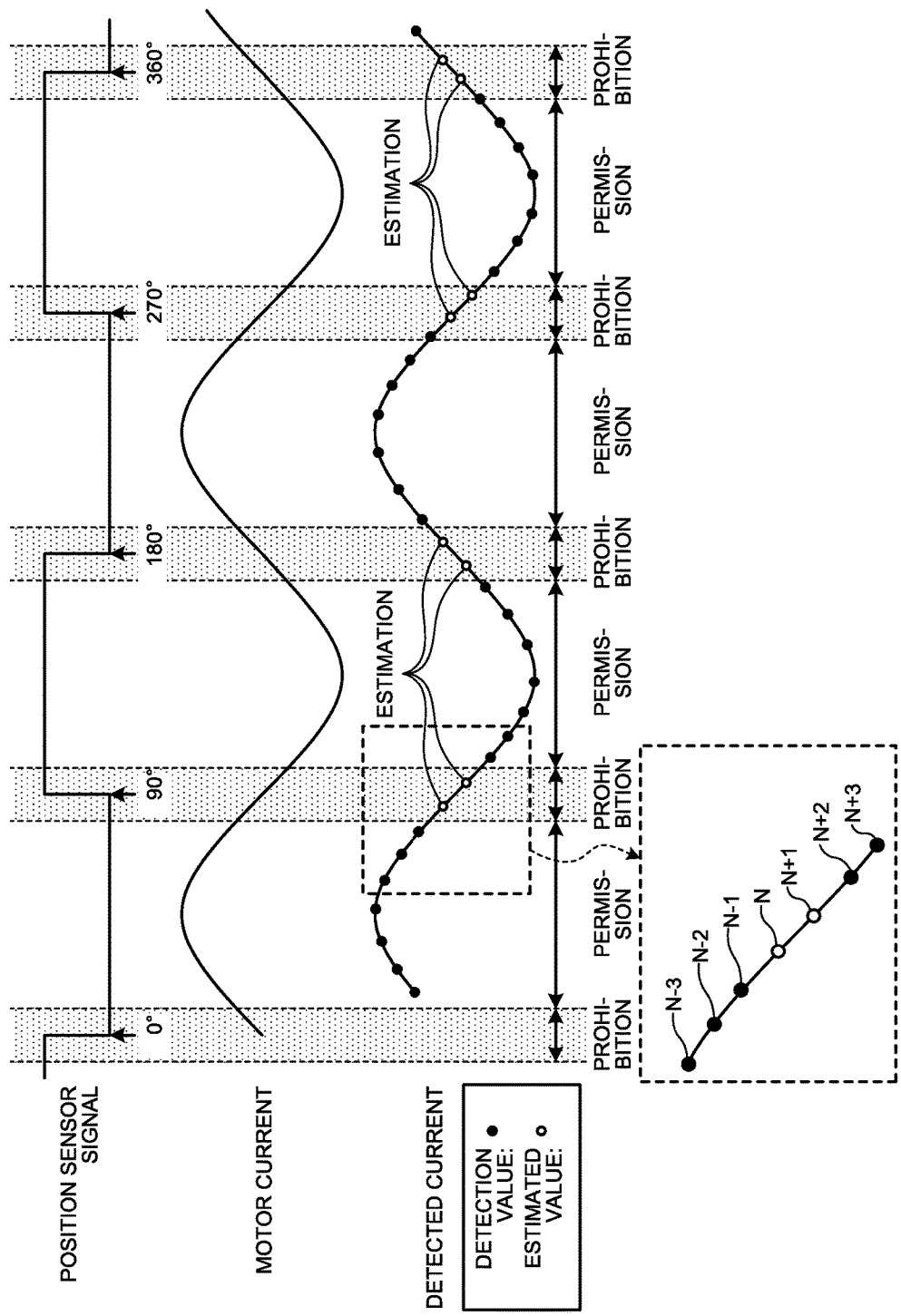
FIG. 7 is a diagram for explaining a method of estimating a current value of a motor current in a prohibition period in the first embodiment.

FIG. 7 is a chart for explaining a method of estimating a current value of a motor current in the prohibition period. In FIG. 7, a "position sensor signal" and a "motor current" are similar to those illustrated in FIG. 5. A "detected current" consists of "detection values" actually measured and "estimated values" obtained by the estimation in the prohibition periods. Note that a "detection value" is indicated by a black circle and an "estimated value" is indicated by a white circle. A point N−3 to a point N−1 indicate three points measured in the permission period immediately before the prohibition period. A point N+2 and a point N+3 indicate two points measured in the permission period immediately after the prohibition period. A point N and a point N+1 indicate two points estimated in the prohibition period. An "estimated value" can be calculated as described below. Because a zero-cross point is present in the prohibition period, the motor current can be approximated by a straight line. Therefore, after calculating a straight line passing through the last two points N−2 and N−1 measured in the permission period immediately before the prohibition period, it is possible to estimate that a current value is present on the straight line, thereby to obtain the point N and the point N+1.

Note that the method of estimating the motor current in the prohibition period is not limited to the example explained above. For example, the point N and the point N+1 may be estimated by polynomial approximation using a last few points measured in the permission period immediately before the prohibition period.

In the motor control, when use is made of vector control for decomposing the motor current into orthogonal two axes, dq axes to control the motor current, the motor current can be treated as a direct-current component, and so it is possible to accurately perform the estimation of the current value explained above.

In addition, when a rotating speed of the motor 12 is constant, a value of this direct-current component does not change. Therefore, it is also possible to easily perform the estimation of the motor current in the prohibition period.

Note that the rotating speed of the motor 12 is the number of revolutions per unit time, for example, the number of revolutions per minute (rpm).

Incidentally, when a variable range of the rotating speed of the motor 12 is wide and the length of the prohibition period is constant irrespective of the rotating speed, a ratio of the prohibition periods in the cycle $T_I$ increases as the rotating speed increases, so that controllability is sometimes deteriorated.

Therefore, in this embodiment, as explained below, the length of the prohibition period is reduced as the rotating speed of the motor 12 increases. In this way, stable controllability is realized even when the variable range of the rotating speed of the motor 12 is wide.

Figure 8:
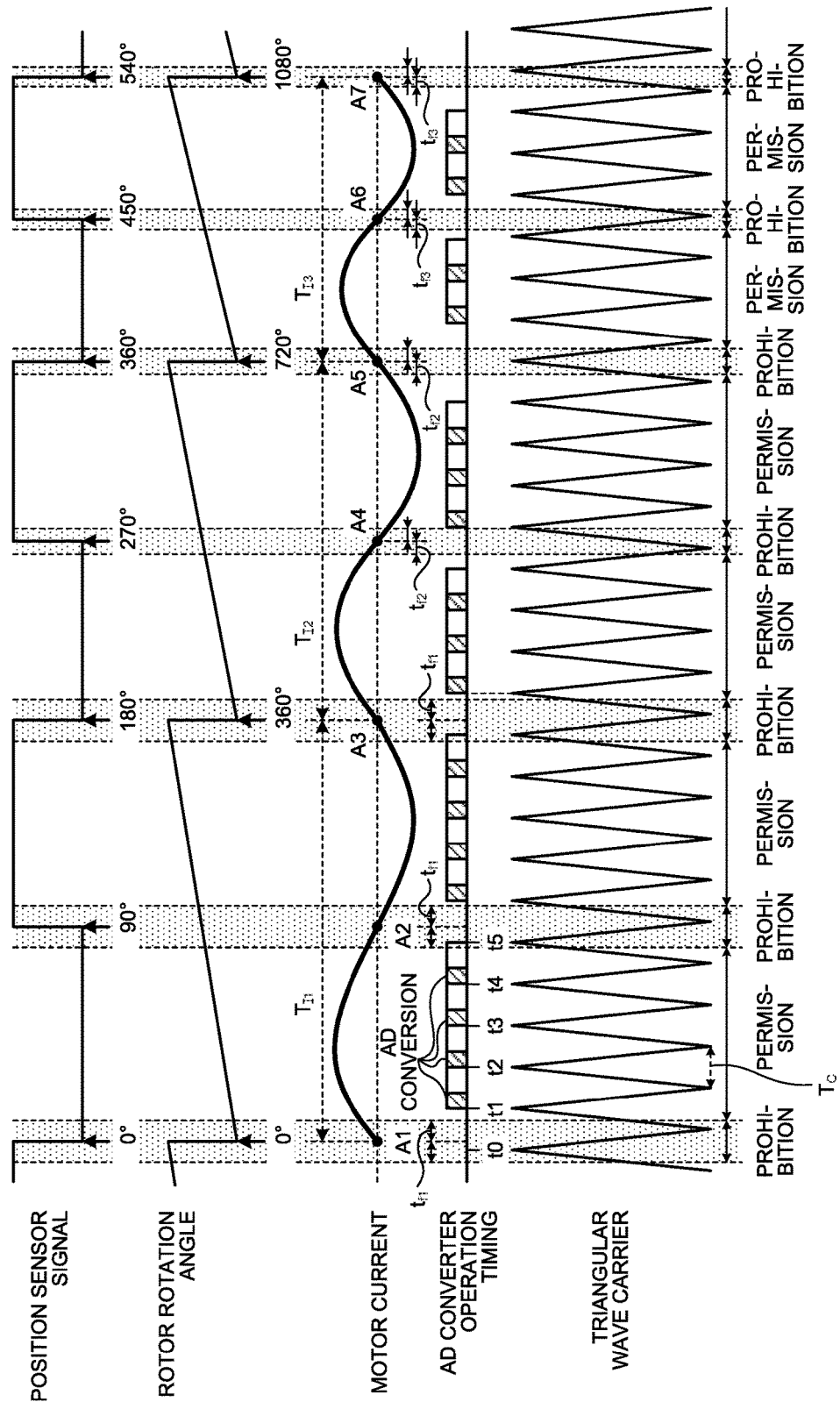
FIG. 8 is another timing chart for explaining timings of start of the AD converter and reading of a digital signal from the AD converter in the first embodiment.

FIG. 8 is another timing chart for explaining the timings of the start of the AD converter 30 and the reading of a digital signal from the AD converter 30, which illustrates control for variably setting a prohibition period according to the rotating speed of the motor 12. In the following paragraphs, only differences from FIG. 5 is explained.

FIG. 8 is a conceptual chart illustrating operations in the case where the cycle $T_I$ decreases with the elapse of time, that is, during acceleration of the motor 12. Specifically, the cycle $T_I$ is represented as $T_{I1}$ in a range of the "rotor rotation angle" from 0° to 360°, $T_{I2}$ in a range of the "rotor rotation angle" from 360° to 720°, and $T_{I3}$ in a range of the "rotor rotation angle" from 720° to 1080°. $T_{I2}$ is shorter than $T_{I1}$ and $T_{I3}$ is shorter than $T_{I2}$.

In a period in which the cycle $T_I$ is $T_{I1}$, a prohibition width that is the length of the prohibition period is set to $2 \times t_{f1}$. That is, the prohibition period including a zero-cross point A1 corresponding to the "rotor rotation angle" of 0° is a period having a total $2 \times t_{f1}$ consisting of $t_{f1}$ and $t_{f1}$ respectively before and after the zero-cross point A1 being in the center thereof. The prohibition period including a zero-cross point A2 next to the zero-cross point A1 is a period having the total $2 \times t_{f1}$ consisting of $t_{f1}$ and $t_{f1}$ respectively before and after the zero-cross point A2 being in the center thereof. The prohibition period including a zero-cross point A3 next to the zero-cross point A2 is a period having the total $2 \times t_{f1}$ consisting of $t_{f1}$ and $t_{f1}$ respectively before and after the zero-cross point A3 being in the center thereof.

In a period in which the cycle $T_I$ is $T_{I2}$, a prohibition width that is the length of the prohibition period is set to $2 \times t_{f2}$. That is, the prohibition period including a zero-cross point A4 next to the zero-cross point A3 is a period having a total $2 \times t_{f2}$ consisting of $t_{f2}$ and $t_{f2}$ respectively before and after the zero-cross point A4 being in the center thereof. The prohibition period including a zero-cross point A5 next to the zero-cross point A4 is a period having the total $2 \times t_{f2}$ consisting of $t_{f2}$ and $t_{f2}$ respectively before and after the zero-cross point A5 being in the center thereof.

In a period in which the cycle $T_I$ is $T_{I3}$, a prohibition width that is the length of the prohibition period is set to $2 \times t_{f3}$. That is, the prohibition period including a zero-cross point A6 next to the zero-cross point A5 is a period having a total $2 \times t_{f3}$ consisting of $t_{f3}$ and $t_{f3}$ respectively before and after the zero-cross point A6 being in the center thereof. The prohibition period including a zero-cross point A7 next to the zero-cross point A6 is a period having the total $2 \times t_{f3}$ consisting of $t_{f3}$ and $t_{f3}$ respectively before and after the zero-cross point A7 being in the center thereof.

In this way, in this embodiment, the prohibition width is reduced as the rotating speed of the motor 12 increases. Even an operation at the time of speed reduction is in a similar way, and the prohibition width is increased as the rotating speed of the motor 12 decreases.

Figure 9:
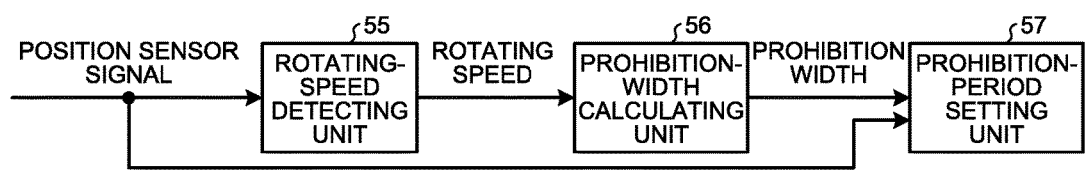
FIG. 9 is a block diagram for explaining processing of setting of a prohibition period in a processor in the first embodiment.

FIG. 9 is a block diagram for explaining processing of setting of a prohibition period in the processor 31. A rotating-speed detecting unit 55, a prohibition-width calculating unit 56, and a prohibition-period setting unit 57 represent functional blocks realized by the processor 31.

The rotating-speed detecting unit 55 detects a rotating speed using the position sensor signal outputted from the position sensor 21. The rotating speed is obtained by detecting a time length between edges of the position sensor signal.

The prohibition-width calculating unit 56 calculates a prohibition width using the rotating speed outputted from the rotating-speed detecting unit 55. The prohibition width is obtained by referring to a characteristic formula or a table that associates the rotating speed and the prohibition width. Information concerning such a characteristic formula or a table is given to the prohibition-width calculating unit 56 in advance.

The prohibition-period setting unit 57 sets a prohibition period using the prohibition width outputted from the prohibition-width calculating unit 56 and the position sensor signal outputted from the position sensor 21. That is, the prohibition-period setting unit 57 calculates a rotor rotation angle from the position sensor signal, calculates a zero-cross point of a motor current on the basis of the calculated rotor rotation angle, and sets the prohibition period including the zero-cross point on the basis of the prohibition width. Note that the setting of the prohibition period may be performed using an edge of the position sensor signal irrespective of the zero-cross point of the motor current.

Figure 10:
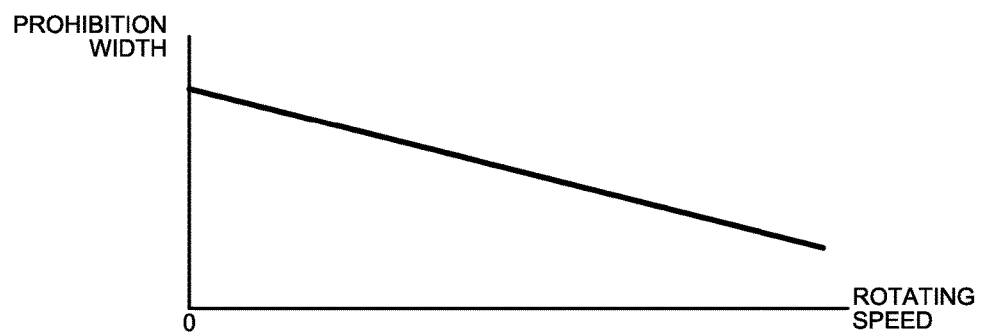
FIG. 10 is a graph illustrating an example of setting of a prohibition width according to a rotational speed in the first embodiment.

FIG. 10 is a graph illustrating an example of setting of a prohibition width corresponding to a rotating speed. The horizontal axis indicates the rotating speed and the vertical axis indicates the prohibition width. In FIG. 10, the prohibition width continuously decreases at a constant rate as the rotating speed increases. In this case, the prohibition-width calculating unit 56 calculates the prohibition width corresponding to the rotating speed with reference to information concerning a linear function illustrated in FIG. 10 as a characteristic formula or information obtained by discretizing the linear function illustrated in FIG. 10 as a table. Note that the prohibition width can also be non-uniformly reduced as the rotating speed increases.

Figure 11:
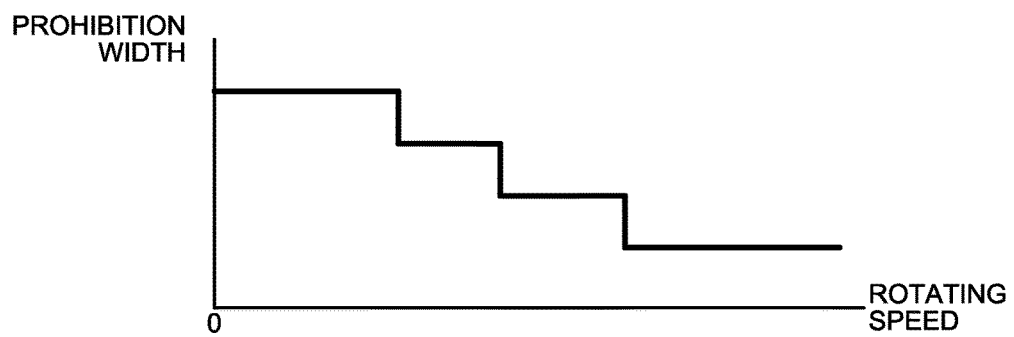
FIG. 11 is a graph illustrating another example of setting of a prohibition width according to a rotational speed in the first embodiment.

FIG. 11 is a graph illustrating another example of the setting of a prohibition width corresponding to a rotating speed. The horizontal axis indicates the rotating speed and the vertical axis indicates the prohibition width. In FIG. 11, the prohibition width decreases stepwise as the rotating speed increases. In this case, the prohibition-width calculating unit 56 calculates the prohibition width corresponding to the rotating speed with reference to information on a function illustrated in FIG. 11 as a characteristic formula or information obtained by discretizing the function illustrated in FIG. 11 as a table.

Figure 12:
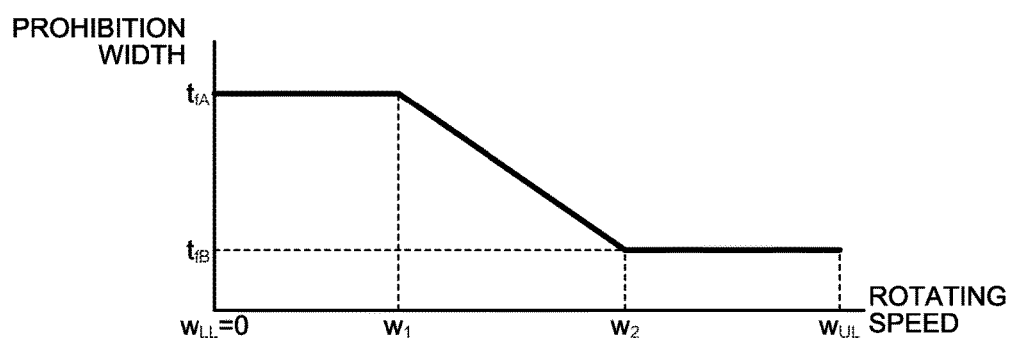
FIG. 12 is a graph illustrating still another example of setting of a prohibition width according to a rotational speed in the first embodiment.

FIG. 12 is a graph illustrating still another example of the setting of a prohibition width corresponding to a rotating speed. The horizontal axis indicates the rotating speed and the vertical axis indicates the prohibition width. In FIG. 12, the prohibition width is $t_{f4}$, constant in the rotating speed from $w_{LL}$ to $w_1$, the prohibition width continuously decreases at a constant rate in the rotating speed from $w_1$ to $w_2$, and the prohibition width is $t_{fB}$, constant in the rotating speed from $w_2$ to $w_{UL}$. Here, $w_{LL}$ is a lower limit value of the rotating speed and is 0. $w_{UL}$ is an upper limit value of the rotating speed and is set in advance. $w_1$ that is a first value is larger than $w_{LL}$, $w_2$ that is a second value is larger than $w_1$, and $w_{UL}$ is larger than $w_2$. $t_{fA}$ is larger than $t_{fB}$. In this case, the prohibition-width calculating unit 56 calculates the prohibition width corresponding to the rotating speed referring to information concerning a function illustrated in FIG. 12 as a characteristic formula or information obtained by discretizing the function illustrated in FIG. 12 as a table.

Note that, in FIG. 5, the prohibition period is set in the phase angle range of $2\alpha$ including the zero-cross point. In the case where such setting of the prohibition period is applied irrespective of the rotating speed, the prohibition width decreases as the rotating speed increases. In this case, a ratio of the prohibition period in the cycle $T_I$ is constant irrespective of the rotating speed. Note that it is also possible to reduce the prohibition period so that the ratio of the prohibition period in the cycle $T_I$ decreases as the rotating speed increases.

Effects of this embodiment are explained. It is known that noise occurs at a zero-cross point of a motor current. Specifically, noise occurs in ON or OFF operation of the switching elements 40 of the inverter 11, and in such circumstances, noise caused by switching is included in the motor current at the zero-cross point where a current polarity is switched. At the zero-cross point of the motor current, a recovery current flows to a reflux diode connected in anti-parallel to transistors constituting the switching elements 40. The recovery current is also a factor of noise.

On the other hand, in this embodiment, a fixed period including each zero-cross point of the motor current is set as the prohibition period in which the start-up of the AD converter 30 is to be prohibited, and the permission period in which the start-up of the AD converter 30 is permitted is set between a prohibition period and the next prohibition period thereto.

The processor 31 outputs the start signal S1 to the AD converter 30 in a permission period to start up the AD converter 30, and reads a digital signal from the AD converter 30 in an electrical half cycle determined by zero-cross periods adjacent to each other including the permission period in question. The permission period is a period of duration that is included in an electrical half cycle from a zero-cross point to the next zero-cross point thereto and does not include these zero-cross points. Consequently, the processor 31 can use, for control, a digital signal converted by the AD converter 30 started in the permission range not including these zero-cross points. Therefore, it is possible to prevent the influence of noise on the control and realize stable motor control.

In this embodiment, the prohibition width that is the length of the prohibition period decreases as the rotating speed of the motor 12 increases. Consequently, even when the rotating speed increases and the cycle $T_I$ decreases, it is possible to prevent a ratio of the prohibition width in the cycle $T_I$ from increasing. Therefore, an estimation period for a current value is reduced as compared with the cycle $T_I$, so that a latest current detection value can be used for the control. By virtue of this situation, deterioration in controllability in a high-rotational-speed region is prevented, and stable control can be realized irrespective of the rotating speed.

On the other hand, in the case where the prohibition period is not reduced according to the rotating speed, the ratio of the prohibition width in the cycle $T_I$ increases in the high-rotational-speed region, and thereby a period in which the latest current detection value can be used is limited and as a result, controllability is deteriorated.

In this embodiment, the setting examples of the prohibition width corresponding to the rotating speed are explained with reference to FIGS. 10 to 12. In the case where the prohibition width is set as illustrated in FIG. 10, although it is necessary to sequentially set the prohibition width, it is possible to realize stable control even when a variable range of the rotating speed is wide. In the case where the prohibition width is set as illustrated in FIG. 11, it is unnecessary to sequentially set the prohibition width. Therefore, it is possible to reduce a computational load. This is suitable for a case where a change in the rotating speed is relatively gentle. In the case where the setting method for the prohibition width illustrated in FIG. 10 and the setting method for the prohibition width illustrated in FIG. 11 are combined as illustrated in FIG. 12, it is possible to realize stable control over a wide rotating speed range while reducing the computational load.

According to this embodiment, because the influence of the noise is minimized, it is possible to achieve improvement of the quality of an electronic apparatus provided with the motor control system 1. Further, by reducing the influence of the noise, even in the case where a filter for noise removal is provided in the motor control system 1, a filter constant can be reduced so that the filter can be downsized and downsizing of components can be achieved.

In this embodiment, the processor 31 performs the reading of a digital signal from the AD converter 30 a number of times in the same electrical half cycle. Detection accuracy of the motor current is higher as the number of times of the reading of a digital signal in the same electrical half cycle is larger. Therefore, as in this embodiment, it is possible to realize stable motor control by setting the number of times of reading of a digital signal from the AD converter 30 in the same electrical cycle to two or more.

In general, the processor 31 starts up the AD converter 30 in a first period, and performs processing of the AD converter 30, that is, reading processing of a digital signal from the AD converter 30 in a second period. The second period is a term from a zero-cross point to the next zero-cross point, that is, an electrical half cycle. The first period is a period of duration that is included in the second period and does not include the zero-cross point and the next zero-cross point, that is, the permission period. Note that, because an edge of the position sensor signal is synchronized with a zero-cross point of the motor current, the second period is a period from an edge that is a change point of the position sensor signal to the next edge that is the next change point. The first period is a period that is included in the second period and shorter than the second period, which does not include the change points.

A third period obtained by excluding the first period from the second period is a period obtained by excluding, from the period from the zero-cross point to the next zero-cross point, a permission period included in that period, which is a prohibition period included in that period. In this embodiment, the length of the third period decreases as the rotating speed of the motor 12 increases.

Figure 13:
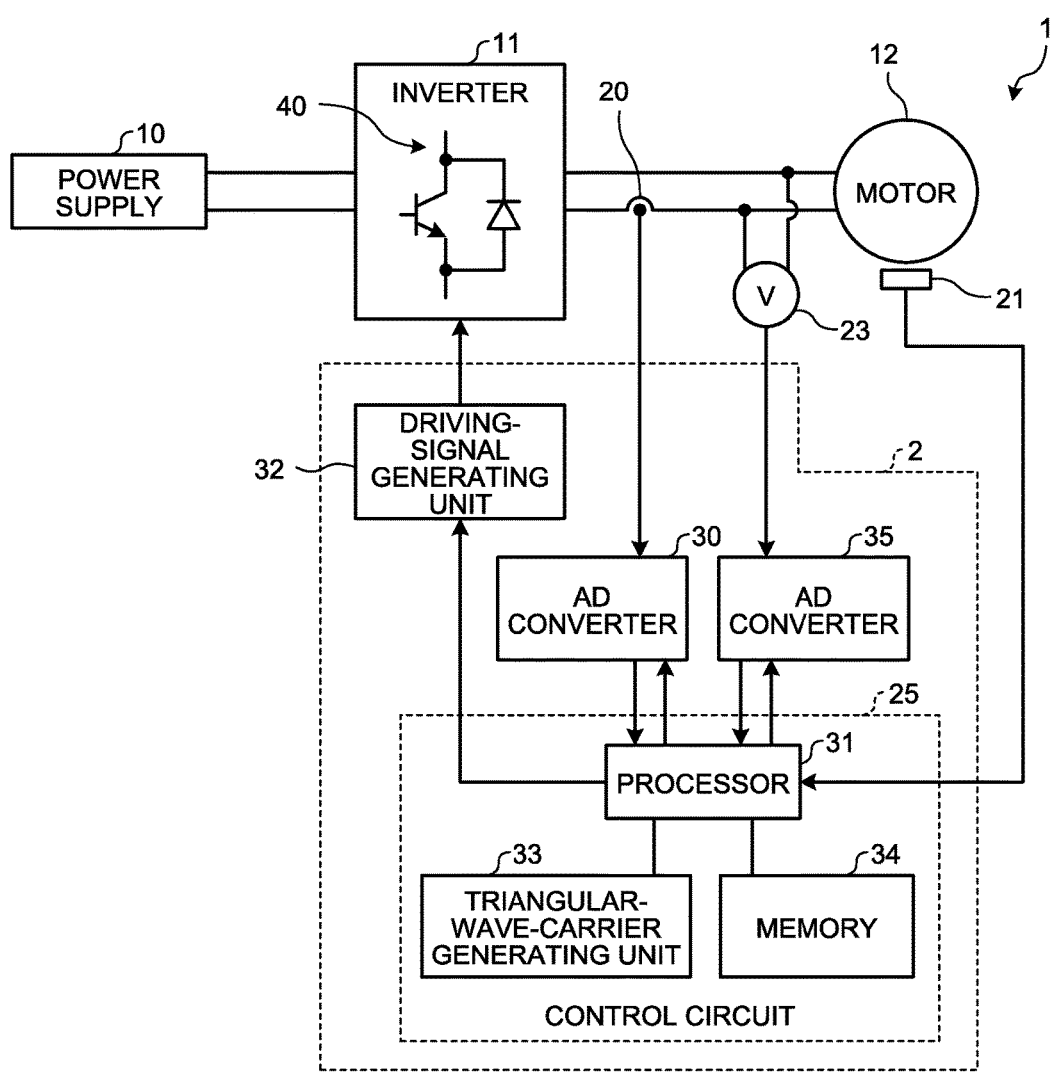
FIG. 13 is a block diagram illustrating a configuration of a motor control system according to a modification of the first embodiment.

A modification of this embodiment is explained. FIG. 13 is a block diagram illustrating the configuration of a motor control system according to the modification of this embodiment. In FIG. 13, the same components as the components illustrated in FIG. 1 are denoted by the same reference numerals or signs.

As illustrated in FIG. 13, the motor control system 1 according to this modification includes, in addition to the configuration illustrated in FIG. 1, a voltage sensor 23 that detects a motor voltage that is an alternating-current voltage across the motor 12 between the motor 12 and the inverter 11, and another AD converter 35 that converts an analog signal, which is a detection value of the motor voltage detected by the voltage sensor 23, into a digital signal.

The AD converter 35 has the same function as the function of the AD converter 30. The AD converter 35 is also the same as the AD converter 30 in that the AD converter 35 is caused to initiate the AD conversion processing in response to the start signal S1 from the processor 31 and the processor 31 receives the completion signal S2 from the AD converter 35 and thereby reads a digital signal from the AD converter 35. The processor 31 drives the inverter 11 using the digital signal read from the AD converter 30 and the digital signal read from the AD converter 35.

The processor 31 performs the start of the AD converter 35 and the reading from the AD converter 35 as explained below. That is, the processor 31 starts up the AD converter 35 during a permission period and reads out a digital signal from the AD converter 35 during an electrical half cycle including the permission period. The electrical half cycle is an electrical half cycle of a motor voltage, which is a term from a zero-cross point of the motor voltage to the next zero-cross point of the motor voltage. In other words, the electrical half cycle is a period from an edge to the next edge of a position sensor signal. The permission period is a period of duration included in a term from the zero-cross point of the motor voltage to the next zero-cross point of the motor voltage, which does not include these zero-cross points. In other words, the permission period is a period of duration included in a term from an edge to the next edge of the position sensor signal, which does not include the edges. The prohibition period means a term between the permission period and the next permission period.

It is known that noise also occurs at the zero-cross points of the motor voltage. Therefore, by using, for control, a digital signal of the motor voltage obtained by the conversion of the AD converter 35 having been started in the period of duration not including any zero-cross points of the motor voltage, it is possible to reduce the influence of the noise on the control and realize stable motor control.

In this modification, the prohibition width that is the length of the prohibition period decreases as the rotating speed of the motor 12 increases. Consequently deterioration in controllability in the high-rotational-speed region is prevented, thereby making it possible to realize stable control irrespective of the rotating speed.

The other components, operations, and effects of this modification are as explained in this embodiment.

It is noted in this modification that in the operation in which the processor 31 starts up the AD converter 35 during the permission period and reads out a digital signal from the AD converter 35 during the electrical half cycle including the permission period, the processor 31 can also determine the electrical half cycle from zero-cross points adjacent to each other of the motor current and set the permission period as a permission period for the duration of the electrical half cycle as in this embodiment. In this case, it is possible to reduce the influence of noise, which occurs at the zero-cross point of the motor current, on the digital signal of the motor voltage.

In this modification, in the operation in which the processor 31 starts up the AD converter 30 during a permission period and reads out a digital signal from the AD converter 30 during an electrical half cycle including the permission period, the processor 31 can also determine the electrical half cycle from zero-cross points adjacent to each other of the motor voltage and set the permission period as a permission period for the duration of the electrical half cycle. In this case, it is possible to reduce the influence of noise, which occurs at the zero-cross point of the motor voltage, on the digital signal of the motor current.

Similarly, it is possible to generalize this embodiment by replacing the motor current with an alternating-current signal related to the motor 12.

In this embodiment, $\alpha$ for specifying a prohibition range is set to $10°$, for example, but $\alpha$ is not limited to this. However, if $\alpha$ is set too large, the number of current values to be estimated in the prohibition range increases. If $\alpha$ is set too small, the control is likely to be affected by noise that occurs at a zero-cross point. Therefore, $\alpha$ is desirably selected from, for example, a range of $5°$ or more and $15°$ or less. The prohibition range may be asymmetrical to the zero-cross point.

Note that, in this embodiment, the position sensor 21 is provided in the motor 12 and a rotor rotation angle is calculated on the basis of the position sensor signal from the position sensor 21, but the position sensor signal may be estimated irrespective of the position sensor 21. Estimation of a rotation position in a so-called sensor-less motor is described in, for example, Japanese Patent No. 5619195.

For at least one of the switching elements 40, a wide band gap semiconductor device is used. The wide band gap semiconductor is, for example, GaN (gallium nitride), SiC (silicon carbide), or diamond. By using the wide band gap semiconductor in the switching element 40, voltage resistance and allowable current density of the switching element 40 increase, and so downsizing of the switching elements 40 can be achieved, and downsizing of a semiconductor module incorporating these elements can be achieved. Because the wide band gap semiconductor has high heat resistance as well, reduction in size of a heat radiation fin of a heat sink can also be achieved.

Second Embodiment

In the first embodiment, description has been given for the motor control system 1 including the motor control device 2, the inverter 11, and the motor 12. In a second embodiment, electric apparatuses including the motor control system 1 described in the first embodiment are explained. As the electric apparatuses, in particular, a vacuum cleaner and a hand drier are explained.

Figure 14:
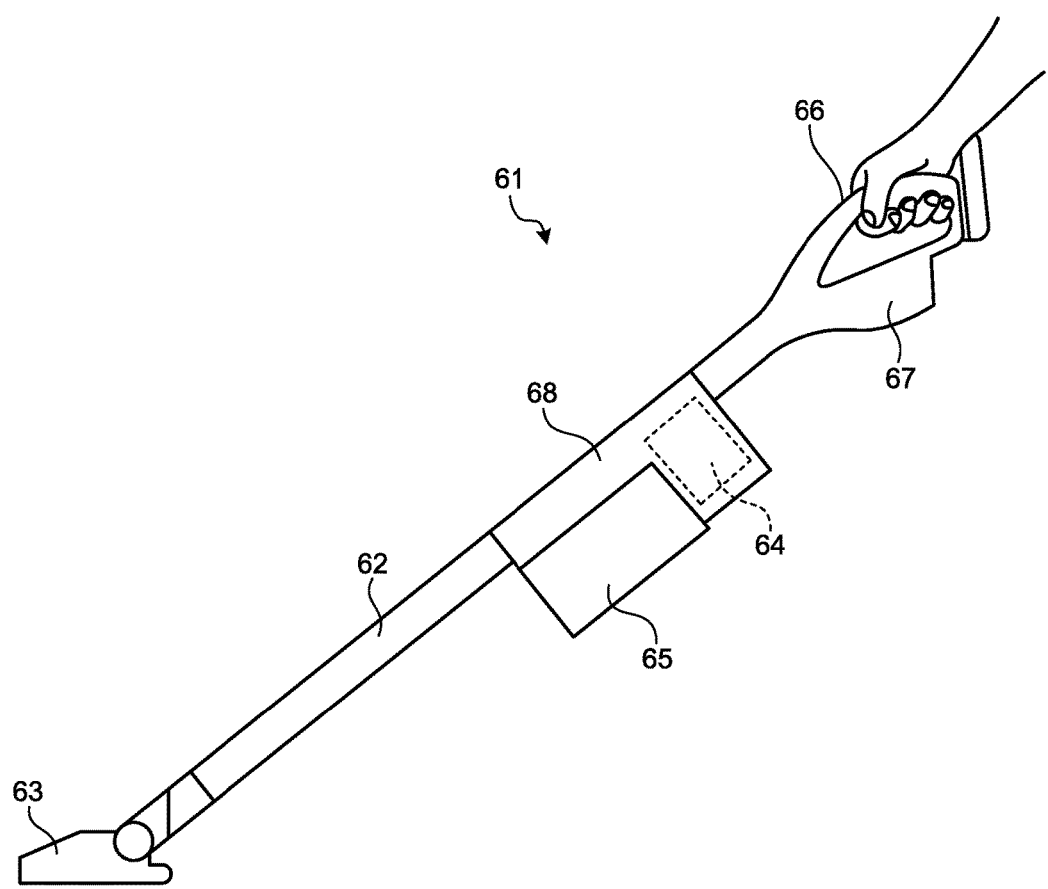
FIG. 14 is a view showing an example of a configuration of a vacuum cleaner in a second embodiment.

FIG. 14 is a diagram illustrating an example of the configuration of a vacuum cleaner 61. The vacuum cleaner 61 includes an extension pipe 62, a suction port body 63, an electric blower 64, a dust collection chamber 65, an operation handle 66, a battery 67, and a sensor 68. The electric blower 64 has the motor control system 1 described in the first embodiment. The vacuum cleaner 61 drives the electric blower 64 using the battery 67 as a power supply, performs suction from the suction port body 63, and sucks dust into the dust collection chamber 65 through the extension pipe 62. When using the vacuum cleaner 61, a user holds the operation handle 66 and operates the vacuum cleaner 61.

The operation handle 66 includes a power switch and an acceleration switch, not illustrated in the figure. The power switch is a switch for supplying electric power from the battery 67 to a main circuit and a control circuit, not illustrated in the figure. The acceleration switch is a switch for accelerating the electric blower 64 from low-speed rotation to steady rotation.

Note that the low-speed rotation refers to rotation of 1/10 or less of the steady number of revolutions. For example, when the steady number of revolutions is 100,000 rpm, rotation of 10,000 rpm or less is the low-speed rotation.

When the above-mentioned power switch is turned on and the power supply from the battery 67 to the main circuit and the control circuit is started, at the same time, the sensor 68 initiates detection.

The sensor 68 detects a movement of the vacuum cleaner 61 or a movement of a person. A not-illustrated motor in the electric blower 64 is started at low speed with being triggered by input of a signal obtained by the detection of the movement of the vacuum cleaner 61 or the movement of the person into the electric blower 64 from the sensor 68.

When the above-mentioned acceleration switch is turned on after the low-speed start, the motor is accelerated from the low-speed rotation to the steady number of revolutions. Note that, when the acceleration switch is turned on before the power switch is turned on, the motor is accelerated to the steady number of revolutions from the start and performs normal operation in response to the power switch being turned on.

When only the acceleration switch is turned off from a state in which the motor is rotating at the steady number of revolutions, the motor continues to operate in the low-speed rotation without stopping. Because the motor continues to operate in the low-speed rotation, it is possible to avoid the possibility of accumulated grit and dust being discharged from the dust collection chamber 65 through the extension pipe 62 to outside when the user moves during a pause of cleaning.

The sensor 68 is a gyro sensor that detects a movement of the vacuum cleaner 61 or a human sensor that detects a movement of the person. It is possible to reduce a reaching time to the steady number of revolutions irrespective of which of the sensors is used to start the vacuum cleaner 61. In this case, by applying the motor control system 1 described in the first embodiment to the vacuum cleaner 61, detection accuracy of an analog signal, which is a motor current or a motor voltage, is improved. Therefore, it is possible to stabilize control in a faster response.

Torque T generated when the motor rotates is determined by a product of a torque constant Kt and a motor current Ia as indicated by the following formula.

$$T = Kt \times Ia$$

In this way, the torque T is proportional to the motor current Ia. Therefore, it is necessary to generate larger torque T to further reduce an acceleration time, and also necessary to further increase the motor current Ia. When a larger motor current Ia is fed, power consumption further increases, and an advantage obtained by further reduction of the acceleration time decreases, thereby resulting in reliability of the components including the battery 67 being spoiled.

To solve such problems, in general, an acceleration rate is controlled. For example, by extending an acceleration time for the motor to reach the normal number of revolutions, it is possible to extend the acceleration time and improve the reliability of the components. In this case, by applying the motor control system 1 described in the first embodiment to the vacuum cleaner 61, detection accuracy of an analog signal that is the motor current or the motor voltage is improved, and accordingly it is possible to reduce fluctuation in the rotating speed of the motor when the acceleration time is controlled.

Further, by reducing an electric current flowing during the start-up, it is possible to reduce a heat value of the components, thereby improving the reliability of the components.

By gently performing the acceleration, the number of revolutions gently increases. Therefore, it is possible to reduce vibration due to sudden acceleration. By reducing the vibration, it is possible to reduce unpleasantness to a human body and the influence on a peripheral apparatus. By reducing the vibration, it is also possible to reduce sound generated from the apparatus.

Note that, when the vacuum cleaner 61 is started up from a stationary state in the method explained above, since a larger amount of force is necessary for that start-up, a more amount of electric current is necessary. Therefore, to reduce a peak of the electric current, it is more effective to control an acceleration rate for the start-up to be smaller. By applying the motor control system 1 described in the first embodiment to the vacuum cleaner 61, detection accuracy of the analog signal, which is the motor current or the motor voltage, is improved. Therefore, it is possible to finely control the acceleration rate.

A changeover switch may be provided to enable the user to switch these acceleration methods and set the acceleration methods.

Operation performed using a gyro sensor is explained. First, when the power switch is manually turned on, the gyro sensor starts to output a signal according to detection of a movement of the vacuum cleaner 61. Low-speed rotation is started when the signal according to the detection of the movement of the vacuum cleaner 61 is outputted from the gyro sensor. The number of revolutions is increased from the low-speed rotation to the steady number of revolutions by manually turning on the acceleration switch. When cleaning is partially completed and the user moves to the next cleaning place, the low-speed rotation is resumed by manually turning off the acceleration switch. When the cleaning is performed again, the rotation is accelerated to the steady number of revolutions by manually turning on the acceleration switch. When the cleaning is ended, the rotation is stopped by manually turning off the power switch.

When the gyro sensor is attached to the vacuum cleaner 61, the gyro sensor detects a movement of the vacuum cleaner 61 that occurs when the vacuum cleaner 61 is used. A main body of the vacuum cleaner 61 always moves immediately before the use of the vacuum cleaner 61. Therefore, by attaching the gyro sensor to the vacuum cleaner 61, it is possible to detect the movement of the vacuum cleaner 61 and start the vacuum cleaner 61 in advance. In this case, by applying the motor control system 1 described in the first embodiment to the vacuum cleaner 61, detection accuracy of the analog signal, which is the motor current or the motor voltage, is improved. Therefore, it is possible to more quickly accelerate the rotation to the steady number of revolutions.

Figure 15:
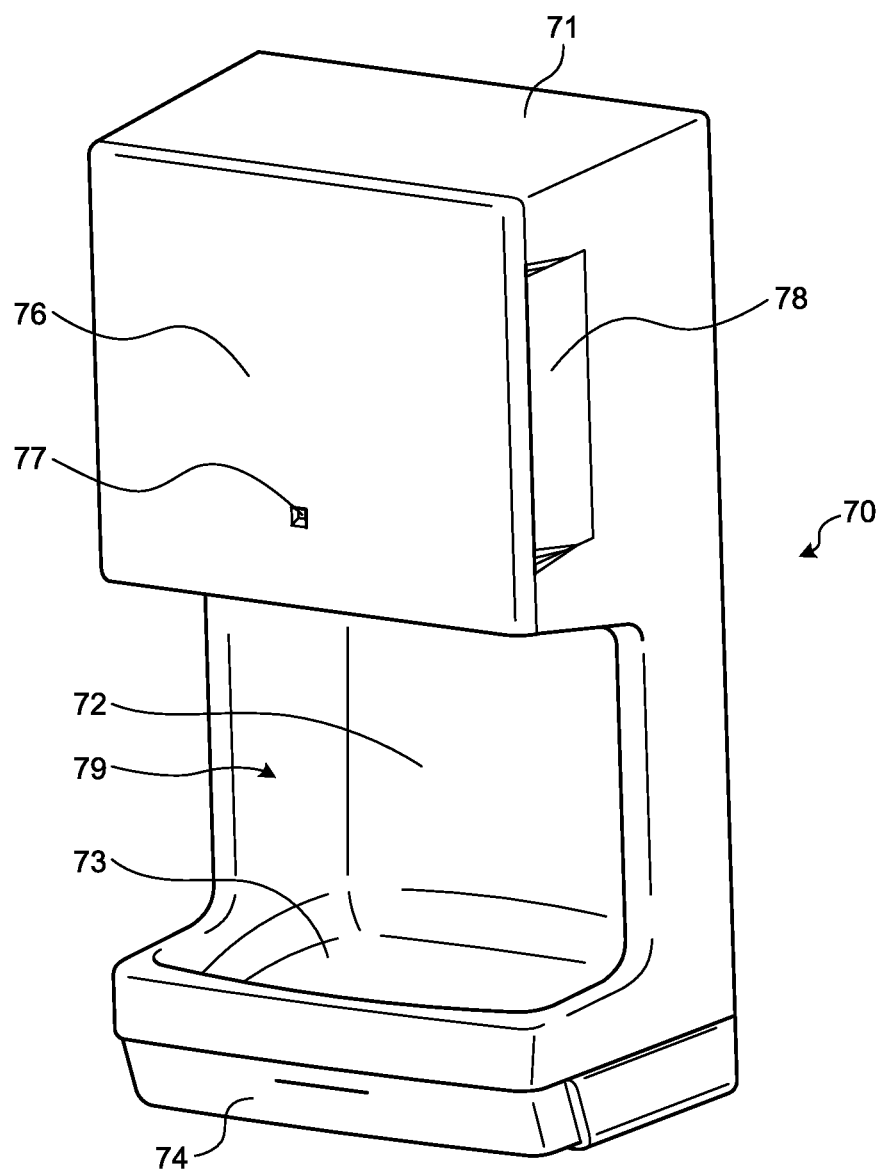
FIG. 15 is a view showing an example of a configuration of a hand drier in the second embodiment.

FIG. 15 is a view showing an example of the configuration of a hand drier 70. The hand drier 70 includes a casing 71, a hand detection sensor 72, a water receiving section 73, a drain container 74, a cover 76, a sensor 77, and an air intake port 78. The sensor 77 is either one of a gyro sensor and a human sensor. The hand drier 70 includes a not-illustrated electric blower inside the casing 71. The electric blower includes the motor control system 1 of the first embodiment. The hand drier 70 has a structure such that, when a hand is inserted into a hand insertion section 79 present on the upper side of the water receiving section 73, water is blown off by air blast caused by the electric blower, and the water is stored in the drain container 74 from the water receiving section 73.

Operation performed when the sensor 77 is the human sensor is explained. First, a person coming around the hand drier 70 is detected by the sensor 77 and the hand drier 70 starts operation at low speed. When the person holds hands up to the hand drier 70 to dry the hands, the hand drier 70 is accelerated toward the steady number of revolutions. When the drying ends and the hands are moved out from the hand insertion section 79, low-speed operation is resumed. When hands of the next person are detected during the low-speed operation, the number of revolutions is increased to the steady number of revolutions again. Unless a person around the hand drier 70 is detected, an operation stop state is maintained.

The sensor 77 is, for example, a sensor that detects an infrared ray, an ultrasonic wave, or visible light. Besides, a temperature sensor or a sensor that detects a person with camera recognition can be used.

By attaching the human sensor to the hand drier 70, it is possible to detect approach of a user to the hand drier 70 and start the hand drier 70 in advance. In this case, by applying the motor control system 1 described in the first embodiment to the hand drier 70, detection accuracy of an analog signal, which is a motor current or a motor voltage, is improved. Therefore, it is possible to more quickly accelerate the hand drier 70 to the steady number of revolutions.

In both of the vacuum cleaner 61 and the hand drier 70, in general, because a large amount of electric current flows to the motor when the motor is started, reliability of the battery and elements in use is deteriorated as the number of times of start increases. Therefore, it is desired to reduce the number of times of start by causing the motor to continue to rotate at low speed without stopping the motor. By applying the motor control system 1 described in the first embodiment to the vacuum cleaner 61 or the hand drier 70, detection accuracy of an analog signal, which is the motor current or the motor voltage, is improved. Therefore, it is possible to realize stable low-speed rotation and improve reliability.

Further, because the reaching time from the low-speed start to the steady number of revolutions is greatly reduced, it is also possible to reduce power consumption by reducing the number of revolutions to the low-speed rotation. At this time, with the motor control system 1 described in the first embodiment, the detection accuracy of an analog signal, which is the motor current or the motor voltage, is improved. It is possible to reduce fluctuation in the rotating speed of the motor and reduce wasteful power consumption.

In general, in the vacuum cleaner 61, when the switch of the operation handle 66 is turned on, the vacuum cleaner 61 reaches the steady number of revolutions from the start. However, by providing a mode for causing the vacuum cleaner 61 to operate at low speed in advance, it is possible to greatly reduce a time until the vacuum cleaner 61 is actually used after the switch of the operation handle 66 is turned on. At this time, by using the motor control system 1 described in the first embodiment, the detection accuracy of an analog signal, which is the motor current or the motor voltage, is improved, thereby making it possible to reduce fluctuation in the rotating speed of the motor and reduce wasteful power consumption.

For example, given that a time from a power supply start to rotation at 2000 rpm is 1 second and a time from the rotation at 2000 rpm to rotation at 100,000 rpm that is the steady number of revolutions is 0.4 seconds, 1.4 seconds is necessary to reach the steady number of revolutions from the start. Therefore, by performing the time-consuming start in advance, it is possible to realize a short time for the switch-on until the steady number of revolutions only in 0.4 second in actual use. At this time, by using the motor control system 1 described in the first embodiment, the detection accuracy of an analog signal, which is the motor current or the motor voltage, is improved. Therefore, it is possible to realize a shorter start time.

During the start in which a steep rise of an input current may occur, by setting an acceleration rate somewhat low and suppressing the steep rise, it is possible to improve the reliability of the battery. At this time, by using the motor control system 1 described in the first embodiment, the detection accuracy of an analog signal, which is the motor current or the motor voltage, is improved. Therefore, it is possible to realize a quick current interruption even during the start in which there is concern about the steep rise.

An electric current flowing to the motor during the start is also reduced by reducing the acceleration rate to the low-speed operation. Therefore, it is possible to reduce heat generation of the components by reducing heat generation of a semiconductor device, thereby leading to improvement of reliability of the components. At this time, by using the motor control system 1 described in the first embodiment, the detection accuracy of an analog signal, which is the motor current or the motor voltage, is improved. Therefore, it is possible to reduce vibration during operation of the low acceleration rate.

As generated heat removal for the semiconductor device, usually, a method of attaching a heat radiation fin having high thermal conductivity to the device surface or a method of diffusing heat to a mounting substrate using a surface mounting device is adopted. There is also a method of providing a fan for heat radiation and blowing wind against the semiconductor device to cool the semiconductor device or a method of cooling the semiconductor device with water. However, these methods are unsuitable for a small apparatus because they lead to increase in cost for the cooling and increase in volume necessary for the provision. However, with the electric apparatus including the electric blower explained in this embodiment, by disposing these heat generating elements or components in a passage of wind generated by the electric blower, it is possible to allow heat to be transferred therefrom with the existing configuration without providing any additional component.

It is possible to prevent an increase in cost because any additional component is not required, and achieve no requirement of a space for providing some additional component, thereby leading to possibility of further downsizing. Furthermore, it is also possible to extend an operation time by allocating, to the battery, a space reserved by possible downsizing. At this time, by using the motor control system 1 described in the first embodiment, the detection accuracy of an analog signal, which is the motor current or the motor voltage, is improved. Therefore, wasteful electric power unnecessary for the operation is rarely consumed, and so the operation time can be further extended.

Note that, in this embodiment, the vacuum cleaner 61 and the hand driver 70 are explained. However, the motor control system 1 in the first embodiment can be applied to an electric apparatus in general mounted with a motor. The electric apparatus mounted with the motor is an apparatus having an electric blower, such as an incinerator, a crusher, a drier, a dust collector, a printing machine, a cleaning machine, a confectionary machine, a tea manufacturing machine, a wood working machine, a plastic extruder, a corrugated board machine, a packaging machine, a hot air generator, or an office automation (OA) apparatus.

The configurations explained in the embodiments above indicate examples of the contents of the present invention. These configurations can be combined with other publicly-known techniques, and partially omitted and/or modified without departing from the scope of the present invention.

The invention claimed is:

1. A motor control device used for a motor driven by an inverter, the motor control device comprising:
   a position detecting unit to detect a position of the motor;
   an analog-digital converter to convert an analog signal into a digital signal, the analog signal being a detection value of an alternating current flowing in the motor; and
   a control circuit to use an output signal from the analog-digital converter to drive the inverter, wherein
   the control circuit starts the analog-digital converter during a first period, and performs processing for the analog-digital converter during a second period,
   the second period is a period from a change point of an output signal from the position detecting unit to a next change point of the output signal,
   the first period is shorter than the second period and does not include the change points, and
   a length of a third period obtained by excluding the first period from the second period decreases as a rotating speed of the motor increases.

2. The motor control device according to claim 1, wherein the length of the third period continuously decreases as the rotating speed of the motor increases.

3. The motor control device according to claim 1, wherein the length of the third period decreases stepwise as the rotating speed of the motor increases.

4. The motor control device according to claim 1, wherein the length of the third period is constant when the rotating speed of the motor is in a range between a lower limit value and a first value, continuously decreases when the rotating speed of the motor changes from the first value that is a second value larger than the first value, and is constant when the rotating speed of the motor is in a range between the second value and an upper limit value.

5. The motor control device according to claim 1, wherein the change points are edges of the output signal.

6. The motor control device according to claim 1, wherein
   the control circuit includes a triangular-wave-carrier generating unit to generate a triangular wave carrier,
   a timing at which the control circuit starts the analog-digital converter is a timing of a ridge point or a trough point of the triangular wave carrier, and
   a timing at which the control circuit performs the processing for the analog-digital converter is a timing of a ridge point or a trough point of the triangular wave carrier.

7. The motor control device according to claim 1, wherein the control circuit performs the processing for the analog-digital converter more than once during the second period.

8. The motor control device according to claim 1, wherein the motor includes an annular stator and a rotor that is disposed on an inner side of the stator and includes a plurality of permanent magnets.

9. The motor control device according to claim 1, wherein
   the inverter includes a plurality of switching elements, and
   at least one of the switching elements is configured using a wide band gap semiconductor.

10. The motor control device according to claim 9, wherein the wide band gap semiconductor is silicon carbide, gallium nitride, or diamond.

11. A vacuum cleaner comprising:
    the motor control device according to claim 1;
    the inverter; and
    the motor.

12. A hand drier comprising:
    the motor control device according to claim 1;
    the inverter; and
    the motor.

13. A motor control device used for a motor driven by an inverter, the motor control device comprising:
    a position detector to detect a position of the motor;
    an analog-digital converter to convert an analog signal that is a detection value of an alternating-current voltage of the motor, into a digital signal; and
    a control circuit to drive the inverter using an output signal of the analog-digital converter, wherein
    the control circuit starts the analog-digital converter during a first period, and performs processing of the analog-digital converter during a second period,
    the second period is a period from a change point to a next change point of an output signal of the position detector,
    the first period is a period which does not include the change points and is shorter than the second period, and
    a length of a third period obtained by excluding the first period from the second period decreases as a rotating speed of the motor increases.

* * * * *